March 16, 1965 A. S. MICHAELS 3,173,867
MEMBRANE SEPARATION DEVICE
Filed Sept. 28, 1962 3 Sheets-Sheet 1
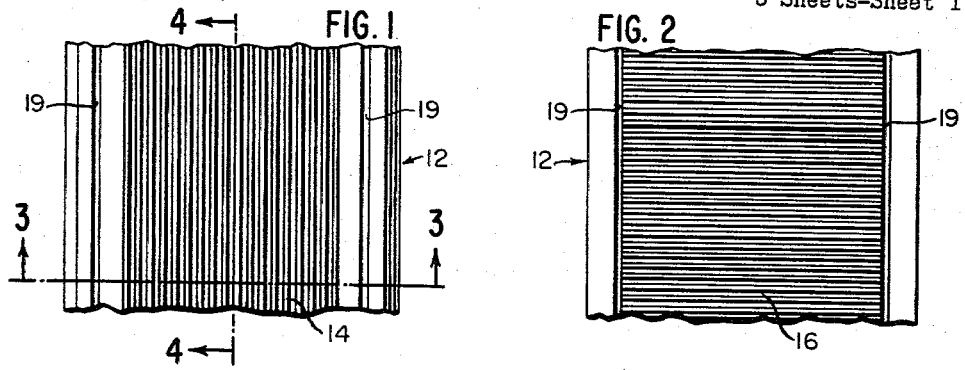
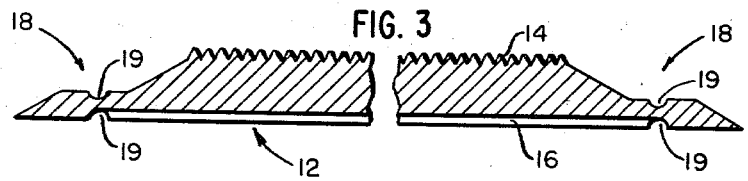
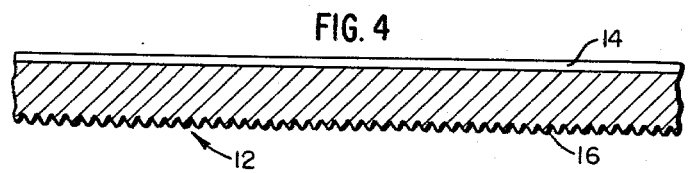
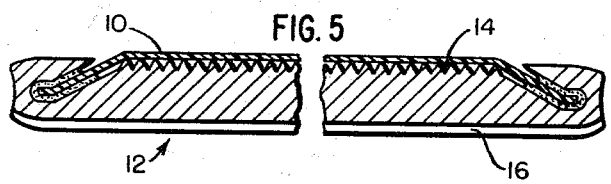
INVENTOR.
ALAN S. MICHAELS
BY Kenway, Jenney & Hildreth
ATTORNEYS March 16, 1965  A. S. MICHAELS  3,173,867
MEMBRANE SEPARATION DEVICE
Filed Sept. 28, 1962  3 Sheets-Sheet 2
FIG. 6
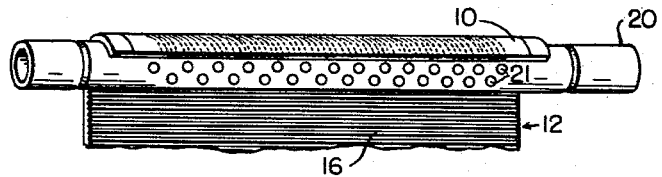
FIG. 7
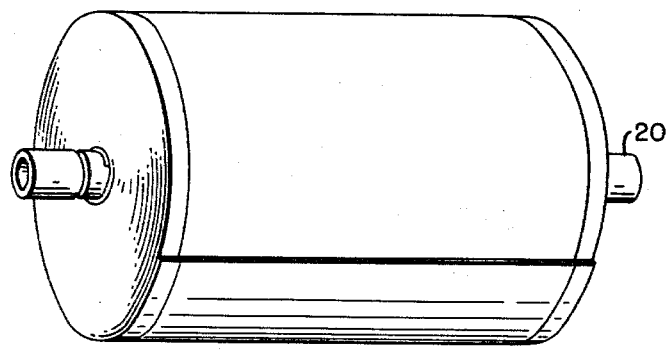
FIG. 8
FIG. 11
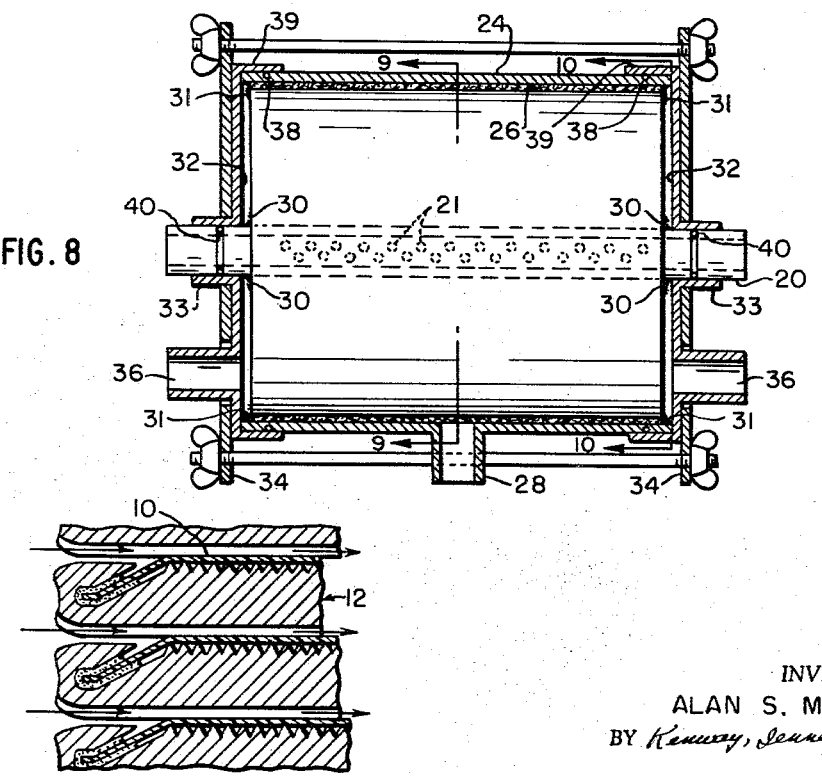
INVENTOR.
ALAN S. MICHAELS
BY Kenway, Jenney & Hildreth
ATTORNEYS March 16, 1965  A. S. MICHAELS  3,173,867
MEMBRANE SEPARATION DEVICE Filed Sept. 28, 1962  3 Sheets-Sheet 3

INVENTOR.
ALAN S. MICHAELS
BY *Kenway, Jenney & Hildreth*

ATTORNEYS

United States Patent Office 3,173,867
Patented Mar. 16, 1965

3,173,867
MEMBRANE SEPARATION DEVICE
Alan S. Michaels, Lexington, Mass., assignor to Amicon Corporation, Cambridge, Mass., a corporation of Massachusetts
Filed Sept. 28, 1962, Ser. No. 226,917
6 Claims. (Cl. 210—321)

This invention relates to devices for carrying out dialysis and other membrane separations in which a fluid is brought into contact with one surface of a membrane so that a component of the fluid will pass through the membrane into another fluid.

There have been developed numerous processes and systems for the separation or purification of solutions and other liquid and gaseous mixtures by means of the selective transmission of material thorugh a membrane from one fluid to another. Ideally the apparatus for such processes should provide a large membrane contact area per unit volume of space occupied, and as best results are attained through thin, structurally weak membrane materials, adequate support for the membrane against deformation or rupture by hydraulic pressure, or thermal or mechanical shock should be provided. In addition the fluid streams in contact with the membrane should be very thin, preferably of a thickness of the same order as the membrane itself, in order to minimize counter-diffusion caused by the concentration gradient which results from depletion of the film of fluid at the membrane-fluid interface. The apparatus should also be constructed so that flow conditions may be varied and ideally the construction should be simple, inexpensive and reliable.

Devices heretofore available for carrying out membrane separations have generally utilized membrane stacks, or sacks, or coiled tubes of membrane materials, and have not fulfilled all the requirements discussed above. In particular no device heretofore available combines high membrane area per unit volume in a compact unit capable of operating at high pressures at greatly varying flow rates and in a simple and inexpensive construction.

It has been proposed to construct a membrane separation cell in the form of a spirally wound assembly in which the membrane separates one fluid flow chamber from another, but no device of this type is yet commercially available, and as far as we are aware none has been successful. In connection with the efforts leading to the present invention, it is noteworthy that combining a membrane with the other elements to form a spiral assembly presents numerous problems. One element of the spiral is inherently longer than the other, and this difference in length must be accommodated. In addition the connections necessary for properly feeding the two fluids to their respective compartments are not easily provided.

The membrane separation cell of this invention is formed of one or more elongated cell units wound as a spiral about a perforated hollow inner core. The basic cell unit consists of an elongated base strip to the margins of which the edges of the separation membrane are attached; the space between the base strip and membrane defining one (the primary) cell region. This unit is wound upon itself with the turns spaced from each other so that the space between the turns defines the other (the secondary) cell region. Fluid flow through the primary cell region is provided for by connecting the inner end of the basic cell unit to the inner core so that it serves as a conduit leading to the inner end of the primary cell region. The outer end discharges into the space surrounding the wound assembly, which is confined within the housing for the unit, and a conduit through the housing provides a fluid connection to the outer end.

In the secondary cell region the fluid is caused to flow in the direction parallel to the spiral axis, between the ends of the housing in which suitable conduits are provided. The primary and secondary cells are separated by an application of a sealant composition to form appropriate gaskets in the region where the two areas would meet.

Basically the present invention centers about the use of a thin backing member, one side of which is formed with a surface configuration which in conjunction with an overlying membrane forms a longitudinal flow path in the primary cell region through which one fluid may be passed, while the other surface is provided with a configuration which results in a transverse flow-path in the secondary cell region which lies between successive turns of the spiral.

For a more complete understanding of this invention reference is made to the following description of what is now considered to be the preferred embodiment of this invention, which is set forth for purposes of illustration and is shown in the accompanying drawings in which:

FIG. 1 is a fragmentary plan view of one side of the interleaving base member illustrating the surface formed with longitudinal channels;

FIG. 2 is a fragmentary view of the other side of the interleaving base member shown in FIG. 1, showing the surface formed with transverse channels;

FIG. 3 is a transverse section through the interleaving base member, taken at 3—3 in FIG. 1;

FIG. 4 is a fragmentary longitudinal section of the interleaving base member, taken at 4—4 in FIG. 1;

FIG. 5 is a transverse section of the membrane-base member laminate showing the membrane assembled with the interleaving base member;

FIG. 6 is an isometric view showing a partial turn of the membrane-base member laminate wound on a hollow perforated feed core, at the start of the winding operation in which the spiral cell is formed;

FIG. 7 is an isometric view of the completed cell winding;

FIG. 8 is an axial cross-section taken through an assembled cell in its casing;

FIG. 11 is a fragmentary view showing the ends of overlapping adjacent turns in the cell winding with arrows representing the transverse flow of fluid.

Figure 9:
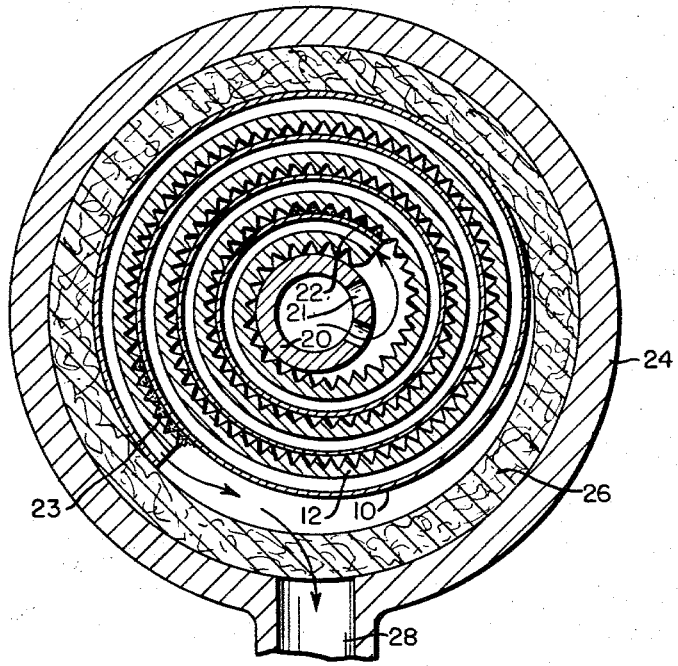
FIG. 9 is a radial section of the cell taken at 9—9 in FIG. 8.

The membrane separation cell of this invention is formed by winding a membrane 10 and an elongated base strip 12 to one side of which the edges of the membrane are secured. The base strip 12 is a long strip of thin material having a surface configuration in a central band on the side facing the membrane which with the membrane defines a longitudinal flow path. As illustrated in FIGS. 1–5 this configuration may take the form of longitudinal shallow grooves, or any other form which will support the membrane and at the same time permit a fluid to flow longitudinally between the base strip 12 and membrane 10.

The other side of the base strip 10 is provided with a surface configuration which, when in contact with the other side of the membrane, will define a transverse flow-path; as illustrated in FIGS. 1–5 this may take the form of transverse grooves.

The base strip 12 is formed with marginal areas 18 on each side of the central band carrying the grooves 14 and 16, to which the edges of the membrane 10 are secured. The marginal portions 18 are of reduce thickness and are each provided with opposed creasing grooves 19, at which each margin is folded around the overlying edge of the membrane 10 and adhesively bonded thereto, as shown in FIG. 5.

The membrane 10 and the base strip 12 thus together define a longitudinal channel (primary cell region) although which one of the fluids in a membrane separation system may be passed. The other fluid is caused to flow on the outside of the assembly, in the tranverse channels between the transverse groove 16 and the membrane 10 lying in contact therewith when the assembly is wound into a spiral. A portion of the successive turns defining the transverse flow-path (secondary cell region) is shown in FIG. 11.

In forming the spiral cell the membrane 10 and base member 12 assembly are wrapped on a hollow core 20 having perforation 21 through which one fluid may be introduce into or removed from the primary cell region. In wrapping the base member 12 and membrane 10 the membrane 10 is preferably located on the outside of the turns, and when wound will be of relatively longer length than the base member 12. The difference in length may be accommodate by utilizing a slow curing viscous liquid adhesive, e.g. an epoxy resin, or isocyanate resin, between the edges of the membrane and the base member margins 18, so that relative slippage can occur, or by forming base member 12 of a relatively compressible material, or the membrane 10 of a relatively elastic material. Alternatively the membrane 10 and base member 12 may be fed separately into the roll and combined just prior to their being wound onto the roll, whereby different length of these materials may be supplied to the spiral.

To separate the two flow paths, a layer of adhesive is applied between the bottom or back of the base strip and the membrane 10 at the end of the first turn, as illustrated at 22 in FIG. 9, and also between these two members at the end of the last turn as illustrated at 23 in FIG. 9. In this manner the fluid flowing in the longitudinal path is prevented from entering at the ends of the wound assembly into the secondary cell region between the membrane and back side of the base strip.

The rolled assembly is arranged for the introduction of fluids to the flow-paths by placing it in a cylindrical housing 24, preferably after applying an outer layer of porous material 26, e.g., gauze, felt or screen, to serve as an outer support which will permit the flow of fluid in the area immediately surrounding the assembly. The rolled assembly with the outer permeable wrapping 26 is contained within a cylindrical shell 24 which is provided with an outlet 28 through which fluid connection is made with the outer end of the primary cell region.

Figure 10:
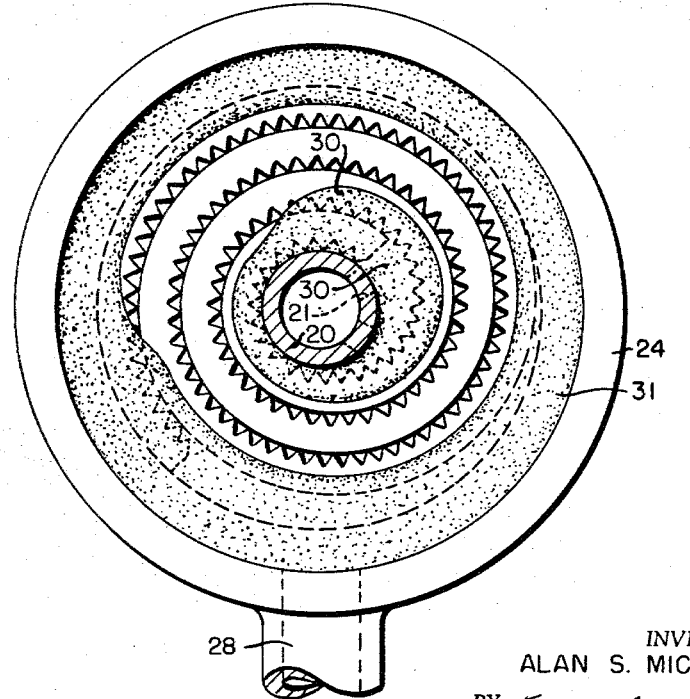
FIG. 10 is a radial section showing the end of the spiral core taken at 10—10 in FIG. 8.

After the wound assembly is placed within the shell 24 coatings 30 and 31 of a viscous, film forming, cement are applied about the edges of the first turn and last turn to provide a seal between the primary and secondary cell regions where they would otherwise be in communication, as shown in FIGS. 8 and 10.

End caps 32, each having tightly fitting collars 33 surrounding the central core 20 fit over the ends of the shell 24, and are held in place by plates 34, which are held together by longitudinal bolts 35. Collared ports 36 in the end caps provide for the introduction of fluid to the ends of the rolled assembly.

In the illustrated embodiment O-rings 38 are provided between the side flanges 39 of each end cap and the ends of the shell 24, and similarly O-rings 40 lie between the central flanges 33 and the central tube 20.

In operation, one of the fluids is introduced into the central tube 20 and removed through the outlet 28 after having flowed in a radial spiral path the length of the longitudinal flow-path. The other fluid is introduced into one of the collared openings 36 in one end cap from where it flows generally parallel to the spiral axis along the transvers flow-paths defined between the successive turns, and then out through the collared opening 36 in the opposite end cap.

In the preferred design of the membrane separation device embodying this invention, the base strip 12 is preferably a thin flexible material, e.g., a plastic such as polyethylene, polypropylene, polyvinyl chloride, cellulose acetate, or a metal such as aluminum, stainless steel, or copper, and may itself constitue a membrane material. Its surface configurations defining the longitudinal and transverse flow-paths, should define a path which is thin relative to the membrane, e.g., between 0.5 and ten one-thousandths of an inch, and the base member itself should also be as thin as possible in order to facilitate winding and to provide for as great as possible a utilization of the space for the membrane material.

An important aspect of the construction of the base strip 12 is that when it is wound up with the membrane successive turns of the base strip come in contact with opposite sides of the membrane, as shown in FIG. 11. This contact is assured by making the central band of the base strip 12 thicker than the margins so that the central portion, not the margins, determines the spacing of the turns, and so that the margins do not obstruct the flow of fluid to the secondary cell region.

The separation membrane may be any of numerous sheet materials useful in membrane separation systems such as cellulose acetate, cellophane, polyethylene or other synthetic or natural sheet materials.

From the foregoing description it will be seen that a high contact area of membrane surface is provided. As an example if the base strip is 0.05 inch thick, the membrane 0.001 inch thick and the grooves 0.010 inch deep, one hundred square inches of membrane per cubic inch of fluid content and about 20 square inches of area per cubic inch of total unit volume are provided. A unit with a volumetric capacity of one quart would provide for a total membrane area of over forty square feet.

In addition to the large area of surface the extreme thicknesss of the fluid layers in the primary and secondary cell regions results in a very high separation efficiency because counter diffusion of the material being transferred is greatly reduced.

The spiral arrangement of the system in a cylindrical housing permits operation at high pressures, since all fluids are confined within the housing and end caps, which can be made as strong as desired. If both fluids are under the same pressure, no pressure differential across the membrane is created.

Membrane separation systems embodying this invention are accordingly useful for many purposes, such as dialysis or ultrafiltration including service as a hemodialyzer (artificial kidney), the removal of salt from seawater, the removal of liquid components by pervaporation, and as a permeator for separating components of gaseous mixtures.

Although this invention has been described with specific reference to the illustrated preferred embodiment, it is apparent that numerous modifications may be made by those skilled in the art and familiar with this disclosure. Different precise base strip constructions may be employed, as well as the manner of assembling the base strip and membrane. Also several base strip-and-membrane assemblies may be wound together on the central core to provide parallel primary cell regions, and several complete membrane separation units may be arranged in series or in parallel, or partly in series and partly in parallel to provide a great variety of types of arrangements for specific purposes.

Having thus disclosed by invention, I claim and desire to secure by Letters Patent:

1. A membrane separation device comprising an elongated base strip having spacing means on both surfaces thereof and an overlying membrane having their longitudinal margins secured together and defining a primary cell region between them having a thickness between five-tenths and ten one-thousandths of an inch, said membrane and base strip being together wound into a spiral assembly to define a secondary cell region between the turns of the spiral, said secondary cell region having a thickness between five-tenths and ten one-thousandths of an inch, a conduit extending to the center of the spiral and communicating with the inner end of the primary cell region, a cylindrical housing surrounding the spiral and communicating with the outer end of the primary cell region, end caps at the opposite ends of the housing communicating with opposite sides of the secondary cell region, sealing means at the opposite sides of the spiral adjacent to the conduit and covering the edges of the innermost turn of the spiral, and sealing means at the opposite sides of the spiral adjacent to the housing and covering the edges of the outermost turn of the spiral, said sealing means separating the primary cell region from the secondary cell region.

2. A membrane separation device comprising a spirally wound assembly defining at least two fluid flow paths; said assembly including an elongated flexible base strip having on one surface a relief configuration defining a longitudinal flow path and on the other surface a relief configuration defining a transverse flow path, and a separation membrane interwound with said base strip and joined thereto at the margins on said one surface thereby forming a primary cell region, having a thickness between five-tenths and ten one-thousandths of an inch, the turns of said assembly establishing a secondary cell region defined between said other surface of said base strip and the separation membrane of the adjacent turn; said secondary cell region having a thickness between five-tenths and ten one-thousandths of an inch, conduit means communicating with the inner end of said primary cell region, a housing surrounding said assembly and communicating with the outer end of said primary cell region, and end caps on the ends of said housing communicating with opposite ends of said secondary cell region.

3. A membrane separation device comprising a spirally wound assembly defining at least two fluid flow paths, said assembly including an elongated flexible base strip having an inner band of relatively greater thickness extending longitudinally between opposed margins of relatively lesser thickness, one surface of said strip having a relief configuration defining a longitudinal flow path and the other surface having a relief configuration defining a transverse flow path, a separation membrane interwound with said strip and joined to the margins on said one surface thereby forming a primary cell region having a thickness between five-tenths and ten one-thousandths of an inch, the turns of said assembly establishing a secondary cell region defined between said other surface of said base strip and the separation membrane of the adjacent turn, said secondary cell region having a thickness between five-tenths and ten one-thousandths of an inch, conduit means communicating with the ends of said primary cell region, and conduit means communicating with the ends of said secondary cell region.

4. The membrane separation device defined by claim 3 wherein the margins of the base strip are less than half the thickness of the inner band and are folded over the edges of the separation membrane.

5. A membrane separation device comprising a spirally wound assembly defining at least two fluid flow paths, said assembly including an elongated flexible base strip having an inner band of relatively greater thickness extending longitudinally between opposed margins of relatively lesser thickness, one surface of said strip having a relief configuration defining a longitudinal flow path and the other surface having a relief configuration defining a transverse flow path, a separation membrane interwound with said strip and joined to the margins on said one surface thereby forming a primary cell region having a thickness between five-tenths and ten one-thousandths of an inch, the turns of said assembly establishing a secondary cell region defined between said other surface of said base strip and the separation membrane of the adjacent turn, said secondary cell region having a thickness between five-tenths and ten one-thousandths of an inch, conduit means communicating with the ends of said primary cell region, a housing surrounding said assembly and communicating with the outer end of said primary cell region, and end caps on the ends of said housing communicating with opposite ends of said secondary cell region.

6. A membrane separation device comprising a spirally wound assembly defining at least two fluid flow paths, said assembly including an elongated flexible base strip having an inner band of relatively greater thickness extending longitudinally between opposed margins of relatively lesser thickness, one surface of said strip having a relief configuration defining a longitudinal flow path and the other surface having a relief configuration defining a transverse flow path, a separation membrane interwound with said strip and joined to the margins on said one surface thereby forming a primary cell region having a thickness between five-tenths and ten one-thousandths of an inch, the turns of said assembly establishing a secondary cell region defined between said other surface of said base strip and the separation membrane of the adjacent turn, said secondary cell region having a thickness between five-tenths and ten one-thousandth of an inch, a conduit extending to the center of the spiral and communicating with the inner end of the primary cell region, a cylindrical housing surrounding the spiral and communicating with the outer end of the primary cell region, end caps at the opposite ends of the housing communicating with opposite sides of the secondary cell region, sealing means at the opposite sides of the spiral adjacent to the conduit and covering the edges of the innermost turn of the spiral, and sealing means at the opposite sides of the spiral adjacent to the housing and covering the edges of the outermost turn of the spiral, said sealing means separating the primary cell region from the secondary cell region.

References Cited in the file of this patent

UNITED STATES PATENTS

| 2,599,604 | Bauer et al. | June 10, 1952 |
| 2,686,154 | MacNeill | Aug. 10, 1954 |
| 2,741,595 | Juda | Apr. 10, 1956 |
| 2,756,206 | Gobel | July 24, 1956 |
| 2,833,413 | Fontein | May 6, 1958 |

FOREIGN PATENTS

| 391,068 | Great Britain | Apr. 20, 1953 |

UNITED STATES PATENT OFFICE
CERTIFICATE OF CORRECTION

Patent No. 3,173,867                      March 16, 1965

Alan S. Michaels

It is hereby certified that error appears in the above numbered patent requiring correction and that the said Letters Patent should read as corrected below.

Column 1, line 17, for "thorugh" read -- through --; column 2, line 71, for "reduce" read -- reduced --; column 3, lines 5 and 6, for "although" read -- through --; line 16, for "perforation" read -- perforations --; line 22, for "accommodate" read -- accommodated --; line 31, for "length" read -- lengths --; column 4, line 37, for "thicknesss" read -- thinness --.

Signed and sealed this 24th day of August 1965.

(SEAL)
Attest:

ERNEST W. SWIDER                       EDWARD J. BRENNER
Attesting Officer                          Commissioner of Patents